WILLIAM F. COULTER, GIDEON COULTER, AND JOHN A. LANERY, OF HARDINSBURG, INDIANA.

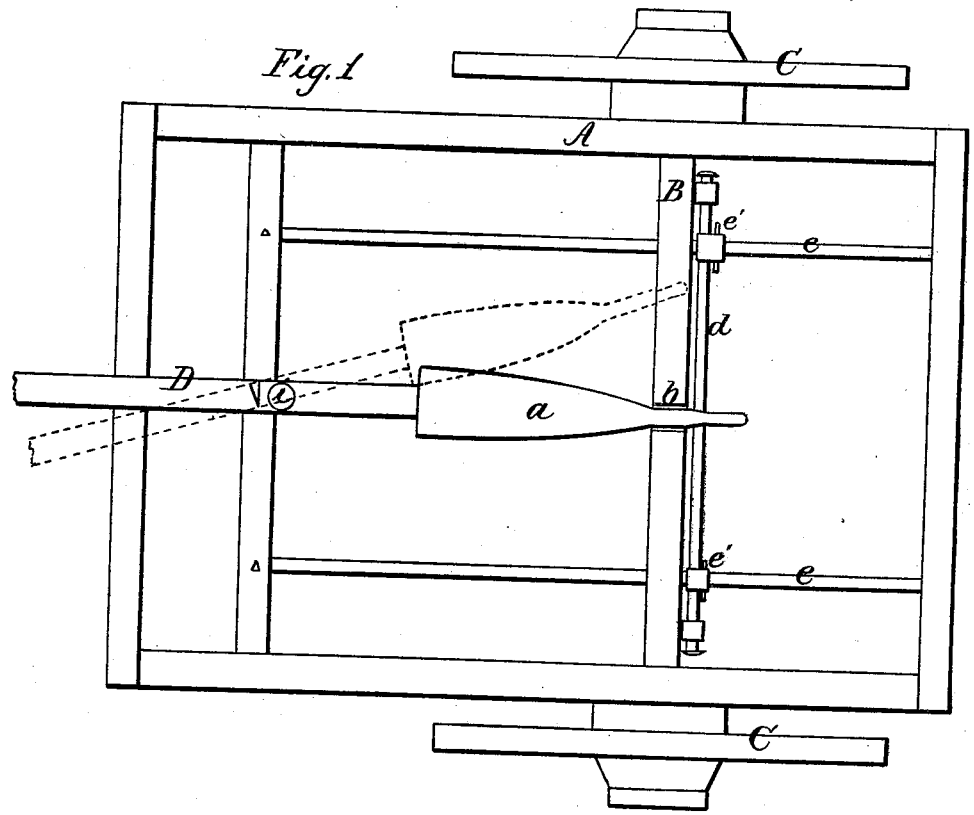
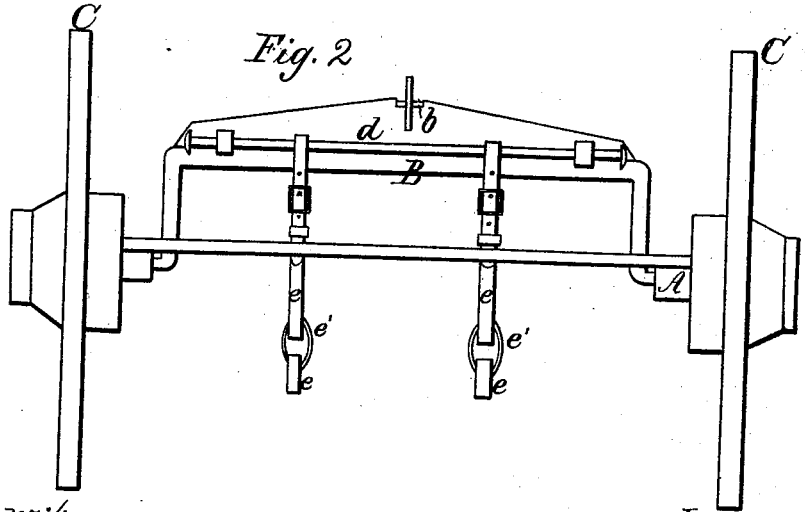

Letters Patent No. 87,824, dated March 16, 1869.

IMPROVEMENT IN WHEEL CULTIVATORS.

The Schedule referred to in these Letters Patent and making part of the same.

*To all whom it may concern:*

Be it known that we, WILLIAM F. COULTER, GIDEON COULTER, and JOHN A. LANERY, of Hardinsburg, in the State of Indiana, have invented a new and useful Improvement in Wheel Cultivators; and we do hereby declare that the following is a full, clear, and exact description of the same, reference being had to the accompanying drawings, and letters of reference marked thereon, making a part of this specification, in which—

Figure 1 is a plan view, and

Figure 2 is a transverse vertical section.

To enable those skilled in the art to make and use our invention, we now proceed to describe its construction and operation.

Similar letters in the drawings refer to like parts.

This invention relates to a cultivator, mounted on wheels; and

It consists in attaching, to the rear end of the pivoted draught-pole of the machine, a spring-bar, and in providing, in the middle of the upper side of the axle, a notch, fitted to receive the said spring-bar, and hold it during such time as the draught-pole projects straight forward, from which notch the spring-bar may be lifted, and turned to one side, and thus cause the draught-pole to assume an inclined position with respect to the frame, when it is desired that the draught-animals shall change direction to the right or left.

In the drawings—

A represents the cultivator-frame, mounted on the crank-axle B, and running on the two wheels C C.

The machine, being intended for two horses, is provided with a draught-pole, D, which is pivoted at $i$, in the centre of the front part of the frame.

To the rear end of the draught-pole is securely attached a spring-bar of steel, which projects back of the axle B, and occupies, when the pole extends straight forward, a notch, $b$, made in the middle of the upper side of the axle, which holds it firmly.

If the spring-bar be lifted out of the notch by hand, it may be turned with the draught-pole, on the pivot $i$, and cause the draught-animals to move in any new direction desired. The spring-bar may, therefore, be aptly termed a steering-device.

To the rear side of the axle is attached, by means of clamps at each end, a rod, $d$, a slight interval being left between the rod and axle.

To each plow-beam, $e$, is fastened a ring, $e'$, vertically under the rod $d$.

Leather straps, $c$, provided each with a buckle, connect the rings with the rod $d$, and, by means of the straps, the beams $e$ may be raised or lowered, as desired.

What we claim as new, and desire to secure by Letters Patent, is—

The spring-bar $a$, attached to the rear end of the draught-bar, in combination with the notch $b$ in the upper side of the axle, as and for the purpose described.

WILLIAM F. COULTER.
GIDEON COULTER.
JOHN A. LANERY.

Witnesses:
   JOHN CRAMER,
   JAMES BULING.